US010004028B2

(12) United States Patent
Astigarraga et al.

(10) Patent No.: US 10,004,028 B2
(45) Date of Patent: Jun. 19, 2018

(54) PAIRED SMART DEVICE THEFT DETERRENT

(71) Applicant: International Business Machines Corporation, Armonk, NY (US)

(72) Inventors: Tara Astigarraga, Fairport, NY (US); Itzhack Goldberg, Hadera (IL); Jose R. Mosqueda Mejia, Puruandiro (MX); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/272,819

(22) Filed: Sep. 22, 2016

(65) Prior Publication Data

US 2018/0084483 A1   Mar. 22, 2018

(51) Int. Cl.
| | |
|---|---|
| *H04W 48/02* | (2009.01) |
| *H04W 76/02* | (2009.01) |
| *H04W 12/06* | (2009.01) |
| *H04W 12/08* | (2009.01) |

(52) U.S. Cl.
CPC .......... *H04W 48/02* (2013.01); *H04W 12/06* (2013.01); *H04W 12/08* (2013.01); *H04W 76/023* (2013.01)

(58) Field of Classification Search
CPC ... H04L 63/0492; H04L 63/08; H04L 63/083; H04W 12/06; H04W 12/08; H04W 76/023; H04W 4/001; H04W 4/008; H04W 84/10; G06F 21/88; G08B 13/1418; G08B 21/24
See application file for complete search history.

(56) References Cited

U.S. PATENT DOCUMENTS

| | | | |
|---|---|---|---|
| 6,694,143 | B1 | 2/2004 | Beamish et al. |
| 7,812,724 | B2 | 10/2010 | Boss et al. |
| 8,045,961 | B2 | 10/2011 | Ayed et al. |
| 8,112,066 | B2 | 2/2012 | Ben Ayed |
| 8,750,797 | B2 | 6/2014 | Ketari |
| 2012/0280789 | A1 | 11/2012 | Gerhardt et al. |
| 2016/0037339 | A1* | 2/2016 | Kavalathara ......... H04W 12/06 455/411 |
| 2016/0227600 | A1* | 8/2016 | Shedletsky ......... H04M 1/7253 |
| 2016/0284199 | A1* | 9/2016 | Dotan-Cohen ....... G08B 21/24 |
| 2016/0381557 | A1* | 12/2016 | Deng ................... H04L 63/107 726/4 |

OTHER PUBLICATIONS

Chandrashekhar, V., "Prevent Your iPhone from Becoming Untraceable when Stolen: Quick Tip", 5 pages, <https://www.igeeksblog.com/prevent-your-iphone-from-becoming-untraceable-when-stolen/>.
Thomas, Dallas, "How to Prevent Thieves from Turning Off Your Stolen Nexus So You Can Locate It", 18 pages, <http://nexus5.wonderhowto.com/how-to/prevent-thieves-from-turning-off-your-stolen-nexus-so-you-can-locate-0155080/>.

* cited by examiner

*Primary Examiner* — George Eng
*Assistant Examiner* — Umair Ahsan
(74) *Attorney, Agent, or Firm* — Edward J. Wixted, III; Brian M. Restauro

(57) ABSTRACT

A request to pair a first device with a second device is received. An indication is sent from the second device to the first device. The indication confirms that the second device is paired with the first device. One or more actions are received from the first device. The one or more actions may be taken on the second device.

17 Claims, 4 Drawing Sheets

PAIRED SMART DEVICE THEFT DETERRENT

BACKGROUND

The present invention relates generally to the field of smart devices, and more particularly to deterring theft of paired smart devices.

Ownership of smart devices, such as smart-watches and smartphones, is prevalent worldwide. Improved processing power, more intuitive user interfaces, longer battery life, and the ability to be interconnected are some of the reasons for widespread usage of smart devices. A short distance, low power connection between two smart devices allow the two smart devices to share data. For example, a smart-watch can monitor the heart rate of a user, send that data to a smartphone, and the smartphone can graph and store the heart rate data for the user to review.

SUMMARY OF THE INVENTION

Embodiments of the present invention include a method, computer program product, and system for deterring theft of smart devices. In one embodiment, a request to pair a first device with a second device is received. An indication is sent from the second device to the first device. The indication confirms that the second device is paired with the first device. One or more actions are received from the first device. The one or more actions may be taken on the second device.

DETAILED DESCRIPTION

Embodiments of the present invention provide for deterring theft of smart devices. A large number of smart devices are stolen annually. A stolen smart device in the hands of a thief presents a myriad of problems to the owner of the smart device, chief among them is financial loss (e.g., replacing the stolen smart device and unauthorized access of bank accounts) and losing personal information including account numbers, photographs, phone numbers, addresses, medical information, business information, and the like. To elude being caught, the smart device thief will power off the smart device or activate airplane mode on the smart device, both of which defeat any location and tracking services for the smart device making recovery of the smart device more difficult. Preventing the thief from disabling the stolen smart device may allow for a faster recovery of the smartphone.

Embodiments of the present invention recognize that there may be a method, computer program product, and computer system for deterring theft of smart devices via monitoring a paired connection of smart devices. The method, computer program product, and computer system may prevent a thief from disabling the smart device so that the smart device may be recovered by tracking the location of the smart device.

The present invention will now be described in detail with reference to the Figures.

Figure 1:
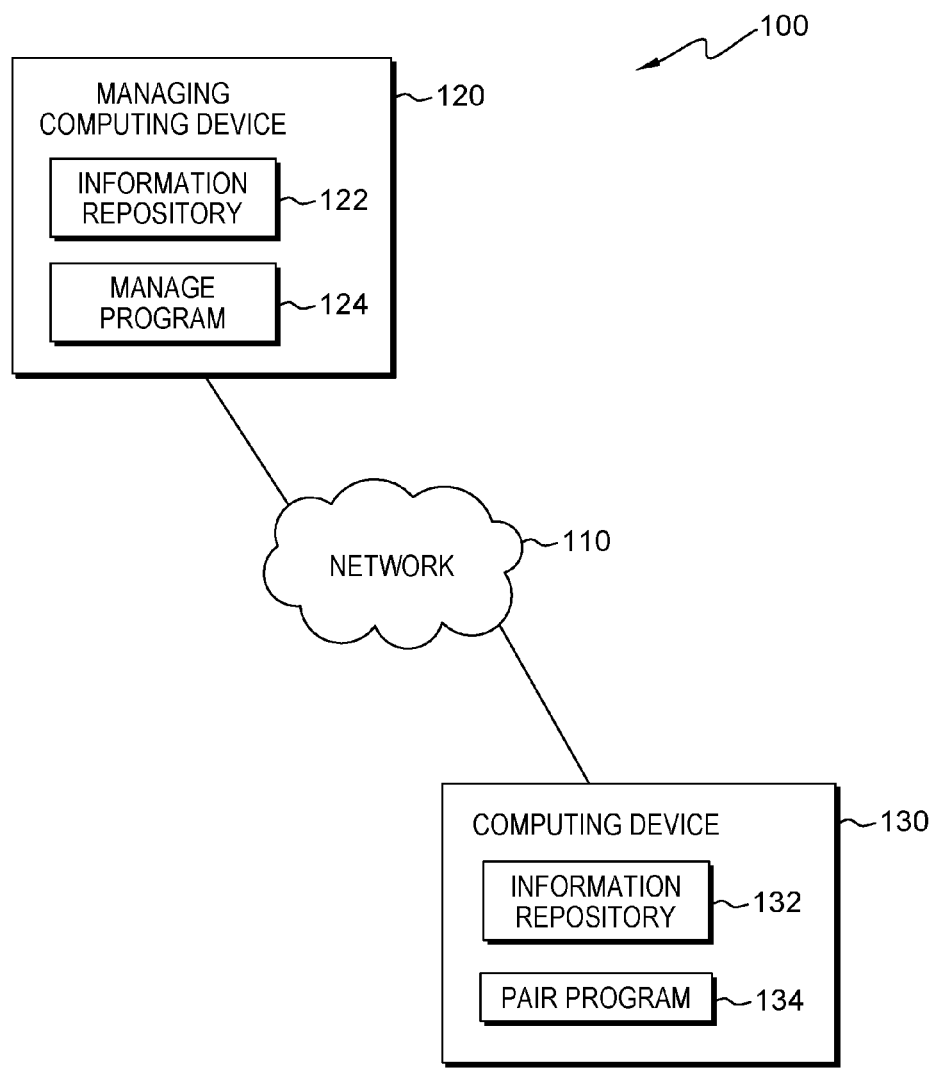
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes managing computing device 120, and computing device 130, connected to network 110. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with managing computing device 120 and computing device 130 over network 110.

In example embodiments, managing computing device 120 and computing device 130 may connect to network 110, which enables managing computing device 120 and computing device 130 to access other computing devices and/or data not directly stored on managing computing device 120 and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between managing computing device 120, computing device 130, and any other computing devices connected to network 110, in accordance with embodiments of the present invention. In an embodiment, data received by another computing device in computing environment 100 (not shown) may be communicated to managing computing device 120 and computing device 130 via network 110.

In embodiments of the present invention, managing computing device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, managing computing device 120 represents a computer system utilizing clustered computers and components (e.g., database server computers, application server computers, etc.) that act as a single pool of seamless resources when accessed by elements of computing environment 100. In general, managing computing device 120 is representative of any electronic device or combination of electronic devices capable of executing computer readable program instructions. Computing environment 100 may include any number of managing computing device 120 and computing device 130. Computing device 130 is substantially similar to managing computing device 120. Managing computing device 120 and computing device 130 may include components as depicted and described in further detail with respect to FIG. 4, in accordance with embodiments of the present invention.

In an embodiment, managing computing device 120 includes information repository 122 and manage program 124.

According to embodiments of the present invention, information repository 122 may be storage that may be written to and/or read by manage program 124. In one embodiment, information repository 122 resides on managing computing device 120. In another embodiment, information repository 122 resides on computing device 130. In other embodiments, information repository 122 may reside on any other device (not shown) in computing environment 100, in cloud storage or on another computing device accessible via network 110. In yet another embodiment, information repository 122 may represent multiple storage devices within managing computing device 120 and/or computing device 130. Examples of data stored to information repository 122 include manage program 124, data related to the instances of computing device 130, owned by a user, that are managed by manage program 124, pair program 134, and the types of actions to be managed by pair program 134. In an embodiment, the types of actions to be managed includes powering off a smart device, turning on airplane mode on a smart device, turning off the global positioning system (GPS) on a smart device, disabling mobile data on a smart device, enabling silent mode on a smart device, and disabling wireless fidelity (Wi-Fi) data on a smart device.

In an embodiment, information repository 122 may be implemented using any volatile or non-volatile storage media for storing information, as known in the art. For example, information repository 122 may be implemented with a tape library, optical library, one or more independent hard disk drives, multiple hard disk drives in a redundant array of independent disks (RAID), solid-state drives (SSD), or random-access memory (RAM). Similarly, information repository 122 may be implemented with any suitable storage architecture known in the art, such as a relational database, an object-oriented database, or one or more tables. In an embodiment of the present invention, manage program 124 and any other programs and applications (not shown) operating on managing computing device 120 may store, read, modify, or write data to information repository 122.

According to embodiments of the present invention, manage program 124 may be a program, a subprogram of a larger program, an application, a plurality of applications, or mobile application software, which functions to manage one or more smart devices owned by a user. A program is a sequence of instructions written by a programmer to perform a specific task. Manage program 124 may run by itself but may be dependent on system software (not shown) to execute. In one embodiment, manage program 124 functions as a stand-alone program residing on managing computing device 120. In another embodiment, manage program 124 may be included as a part of computing device 130. In yet another embodiment, manage program 124 may work in conjunction with other programs, applications, etc., found on managing computing device 120 or in computing environment 100. In yet another embodiment, manage program 124 may be found on other computing devices (not shown) in computing environment 100, which are interconnected to managing computing device 120 via network 110.

In an embodiment, manage program 124 may receive input regarding a number of smart devices to be managed. In an embodiment, manage program 124 may receive input regarding one or more actions that may be executed by the number of smart devices. In an embodiment, manage program 124 may store the previously received input to a memory. In an embodiment, manage program 124 may send a request to pair two of the managed smart devices. In an embodiment, manage program 124 may send pair program 134 to the managed smart devices. In an embodiment, manage program 124 may send an activation to the managed smart devices to activate pair program 134.

As previously discussed, computing device 130 is substantially similar to managing computing device 120. In an embodiment, computing device 130 and managing computing device 120 may be the same smart device. In another embodiment, computing device 130 and managing computing device 120 may be different smart devices. According to an embodiment of the present invention, computing device 130 includes information repository 132 and pair program 134.

In an embodiment, information repository 132 is substantially similar to information repository 122. Examples of data stored to information repository 132 include authentication data (e.g., password data, biometric data, etc.) used by computing device 130 to turn on and turn off various functions, such as the main power, airplane mode, mobile data, and Wi-Fi data, included on computing device 130. Other data stored to information repository 132 may include data related to the owner of computing device 130 and data related to all instances of computing device 130 owned by the same owner that are managed by manage program 124.

According to embodiments of the present invention, pair program 134 may be a program, a subprogram of a larger program, an application, a plurality of applications, or mobile application software, which functions to deter theft of smart devices via monitoring the pairing of two smart devices. In other words, a user may pair a smart-watch with a smart phone while the user is flying to a vacation destination. If the pairing is broken (e.g., the smartphone is stolen and the thief has moved away from the user), pair program 134 may require an authentication (e.g., a password) prior to executing an action (e.g., powering off the smartphone) so that the thief cannot easily disable location features in the smartphone. This may make the smartphone more easily recoverable. Pair program 134 may run by itself but may be dependent on system software (not shown) to execute. In one embodiment, pair program 134 functions as a stand-alone program residing on computing device 130. In another embodiment, pair program 134 may be included as a part of managing computing device 120. In yet another embodiment, pair program 134 may work in conjunction with other programs, applications, etc., found on computing device 130 or in computing environment 100. In yet another embodiment, pair program 134 may be found on other computing devices (not shown) in computing environment 100, which are interconnected to computing device 130 via network 110.

In an embodiment, pair program 134 may confirm a pairing between two smart devices. In an embodiment, pair program 134 may monitor the pairing between the two smart devices. In an embodiment, pair program 134 may receive an indication of an action to be executed on a smart device. In an embodiment, upon receiving the indication, pair program 134 may determine whether the pairing is still intact. In an embodiment, in response to determining that the pairing is still intact, pair program 134 may allow the action to execute without an authentication. In an embodiment, pair program 134 may request an authentication if the pairing is not still intact. In an embodiment, pair program 134 may determine if the authentication is correct. In an embodiment, in response to determining that the authentication is correct, pair program 134 allows the action to be executed. In an embodiment, in response to determining that the authentication is not correct, pair program 134 may send an alert to the user. In an embodiment, pair program 134 may prevent the execution of the action.

Figure 2:
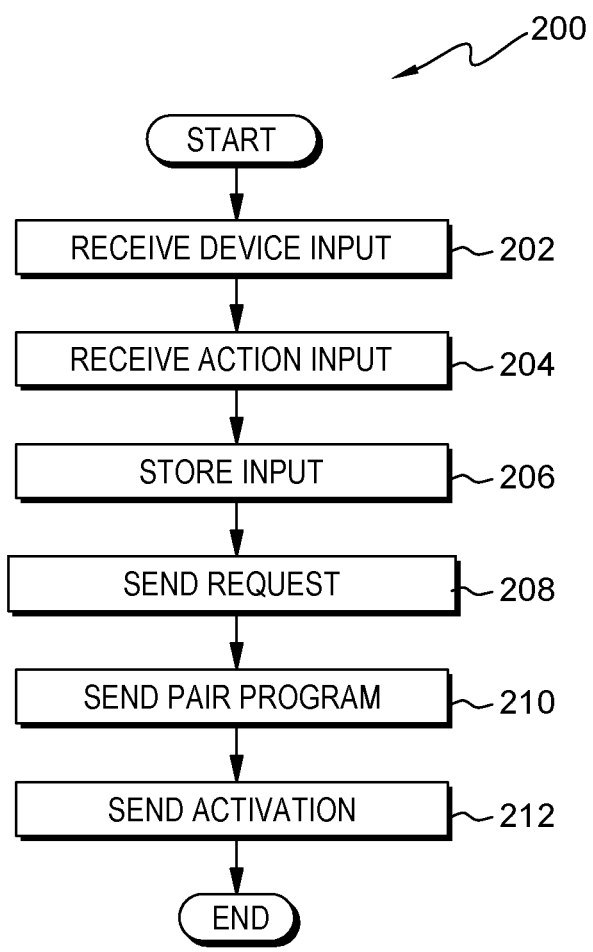
FIG. 2 depicts a flowchart of a program for managing smart devices, in accordance with an embodiment of the present invention.

FIG. 2 is a flowchart of workflow 200 depicting a method for managing one or more smart devices owned by a user. In one embodiment, the method of workflow 200 is performed by manage program 124. In an alternative embodiment, the method of workflow 200 may be performed by any other program working with manage program 124. In an embodiment, a user, via a user interface (not shown), may invoke workflow 200 upon powering on a smart device. In an alternative embodiment, a user may invoke workflow 200 upon accessing manage program 124.

In an embodiment, manage program 124 receives device input (step 202). In other words, manage program 124 receives input from a user of a number of smart devices (i.e., computing devices) that manage program 124 will manage. In an embodiment, the user may input one instance of computing device 130 to be managed via manage program 124 on managing computing device 120. In another embodiment, the user may input more than one instance of computing device 130 to be managed via manage program 124 on managing computing device 120. For example, "Joe" inputs three smart devices to be managed: a smart-watch, a smartphone, and a tablet computer. In the example, "Joe" uses the tablet computer to input the information.

In an embodiment, manage program 124 receives action input (step 204). In other words, manage program 124 receives a listing of the actions which may require an authentication from the user to execute. In an embodiment, the input may be received from a user. In another embodiment, the input may be received from manage program 124 (i.e., the list of actions is pre-programmed in manage program 124). In an embodiment, the listing of actions includes powering off a smart device, turning on airplane mode on a smart device, turning off the GPS on a smart device, disabling mobile data on a smart device, enabling silent mode on a smart device, and disabling wireless fidelity (Wi-Fi) data on a smart device. In an embodiment, manage program 124, on managing computing device 120, receives input from a user, via a user interface (not shown), of the actions that require authentication prior to execution. For example, "Joe" uses the tablet computer to input that "Joe" will require an authentication to power off or turn on airplane mode on both the smart-watch and smartphone owned by "Joe".

In an embodiment, manage program 124 stores input (step 206). In other words, manage program 124 stores the device input (step 202) and the action input (step 204) to an information repository. In an embodiment, manage program 124 stores the received device input and the received action input to information repository 122 on managing computing device 120. In an embodiment, the received device input and the received action input is also stored to information repository 132, which is accessible by pair program 134. For example, the device input from "Joe" (i.e., that the smart-watch, smartphone, and tablet computer owned by "Joe" will be managed) and the action input from "Joe" (i.e., that powering off or enabling airplane mode on either the smart-watch or smartphone owned by "Joe" require an authentication prior to executing) is stored to a memory on the tablet computer owned by "Joe".

In an embodiment, manage program 124 sends a request (step 208). In other words, manage program 124 sends a request to each received smart device (step 202) to pair each smart device with the managing computing device. In an embodiment, "pairing" smart devices is establishing a wireless connection, over a short distance, between smart devices so that the smart devices may exchange data such as sending music on a smartphone to a paired wireless speaker so that the music may be heard via the speaker. In an embodiment, the pairing may be accomplished using any low power, short distance communication technology known in the art. In an embodiment, manage program 124 on managing computing device 120 sends a request to computing device 130 to pair computing device 130 with managing computing device 120. For example, "Joe" pairs the smart-watch owned by "Joe" with the tablet computer owned by "Joe" as well as the smartphone owned by "Joe" with the tablet computer owned by "Joe".

In an embodiment, manage program 124 sends pair program 134 (step 210). In other words, manage program 124 uses the pairing (step 208) to send a copy of pair program 134 to each paired smart device. In an embodiment, manage program 124, on managing computing device 120, sends a copy of pair program 134 that was stored to information repository 122 to computing device 130. In another embodiment, manage program 124 sends a location of pair program 134 to computing device 130 so that computing device 130 may download pair program 134 from the location. In an embodiment, pair program 134 installs on computing device 130 when pair program 134 is received by or downloaded to computing device 130. For example, the tablet computer owned by "Joe" sends a program to the smart-watch owned by "Joe" as well as to the smartphone owned by "Joe". The program is installed on both the smart-watch owned by "Joe" and the smartphone owned by "Joe". In another embodiment, pair program 134 may already be present on one or more of the paired smart devices. In the embodiment, pair program 134, sent most recently by manage program 124, will not install but will instead be deleted.

In an embodiment, manage program 124 sends an activation (step 212). In other words, manage program 124 sends an activation message to each smart device that received pair program 134 (step 210) to activate pair program 134. In an embodiment, manage program 124, on managing computing device 120, sends an activation to computing device 130. In an embodiment, the sent activation activates pair program 134. In another embodiment, the activation is sent but not required as pair program 134 is activated during the installation of pair program 134 (step 210). In yet another embodiment, a user may deactivate pair program 134 and reactivate pair program 134 later. For example, a program is activated on both the smart-watch and the smartphone owned by "Joe".

Figure 3:
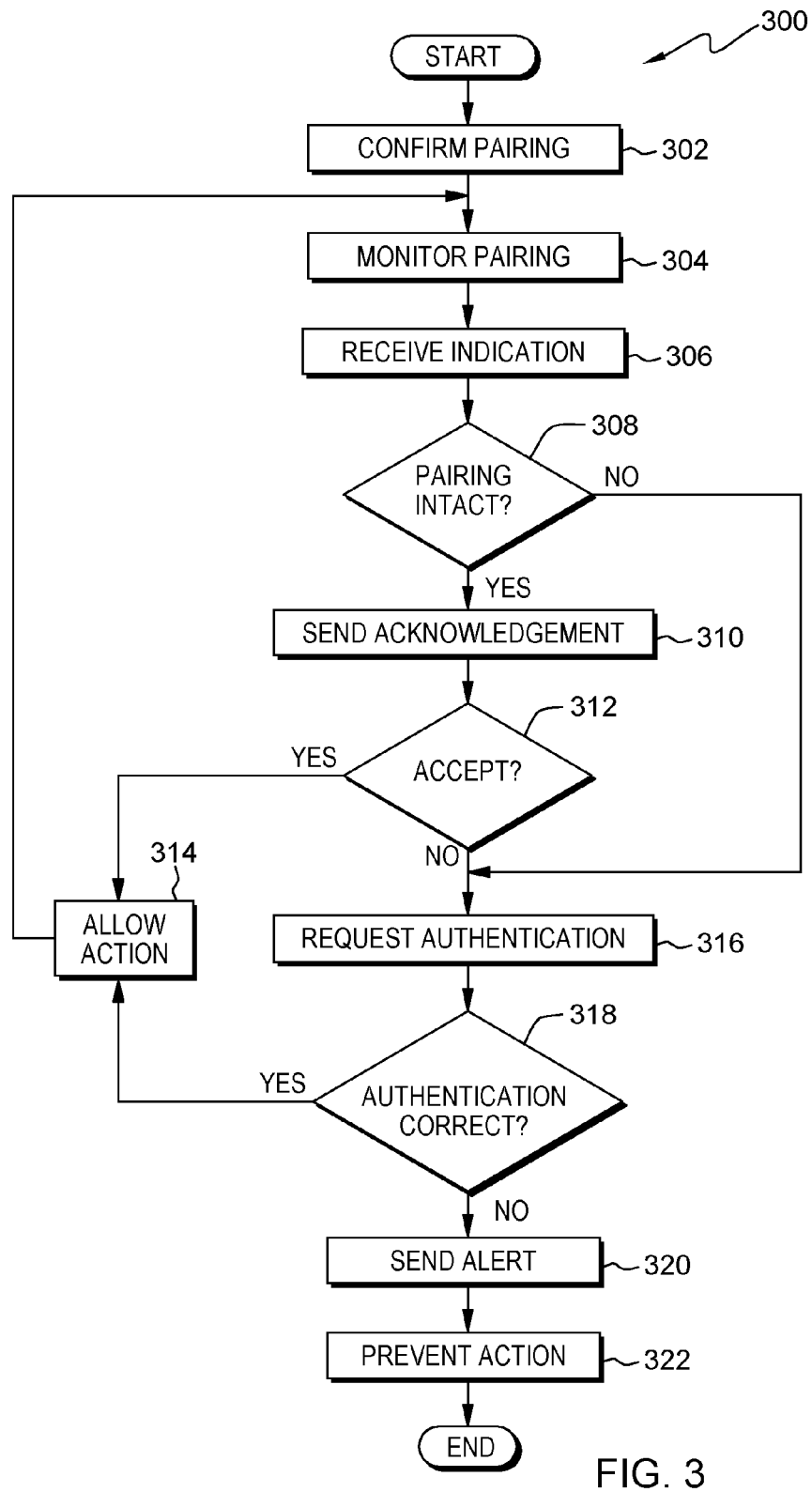
FIG. 3 depicts a flowchart of a program for deterring theft of smart devices, in accordance with an embodiment of the present invention.

FIG. 3 is a flowchart of workflow 300 depicting a method for deterring theft of smart devices. In one embodiment, the method of workflow 300 is performed by pair program 134. In an alternative embodiment, the method of workflow 300 may be performed by any other program working with pair program 134. In an embodiment, workflow 300 may be invoked upon a pairing of smart devices being broken. In an alternative embodiment, a user may invoke workflow 300 upon accessing pair program 134.

In an embodiment, pair program 134 confirms a pairing (step 302). In other words, pair program 134 confirms that the previously paired smart devices remain paired upon activation of pair program 134 (step 212). In an embodiment, a pairing is confirmed by verifying that data is sent from one smart device to the other smart device in the pairing. In another embodiment, a pairing is confirmed using the equivalent of a ping utility. A ping utility is used to test the reachability of one smart device by another device. In an embodiment, pair program 134 confirms the pairing between computing device 130 and managing computing device 120. For example, the smart-watch owned by "Joe" confirms that the smart-watch owned by "Joe" is paired with the tablet computer owned by "Joe" and the smartphone owned by "Joe" confirms that the smartphone owned by "Joe" is also paired with the tablet computer owned by "Joe".

In an embodiment, pair program 134 monitors a pairing (step 304). In other words, pair program 134 monitors the pairing between smart devices to ensure that the pairing remains intact. In an embodiment, the monitoring is done using previously discussed techniques. In an embodiment, the monitoring may be continuous so that a break in the pairing is immediately detected. In another embodiment, the monitoring may be periodic (e.g., monitored once every thirty seconds, monitored once every sixty seconds, monitored once ever one hundred and twenty seconds, etc.) so that a break in the pairing is detected on the selected monitoring frequency. In an embodiment, pair program 134 continuously monitors the pairing between computing device 130 and managing computing device 120. For example, the pairing of the smart-watch owned by "Joe" and the tablet computer owned by "Joe" is continuously monitored, as is the pairing of the smartphone owned by "Joe" and the tablet computer owned by "Joe".

In an embodiment, pair program 134 receives an indication (step 306). In other words, pair program 134 receives an indication of an action to be executed on a smart device. In an embodiment, the indication may be received from the operating system (OS) of the smart device. In another embodiment, the indication may be received from any other program working with the OS of the smart device. According to embodiments of the present invention, the action to be executed may be to power off the smart device, to enable airplane mode on the smart device, to turn off the GPS on the smart device, to turn off the mobile data on the smart device, enabling silent mode on the smart device, or to turn off Wi-Fi data on the smart device. In an embodiment, pair program 134 receives an indication of an action to be executed on computing device 130. For example, the smartphone owned by "Joe" receives an indication to power down.

In an embodiment, pair program 134 determines whether a pairing is intact (decision step 308). In other words, pair program 134 determines whether the pairing between smart devices is intact. In an embodiment, the determination is made via a ping utility (previously discussed). In one embodiment (decision step 308, YES branch), the pairing between smart devices is intact; therefore, pair program 134 proceeds to step 310 to send an acknowledgement. In the embodiment (decision step 308, NO branch), the pairing between smart devices is not intact; therefore, pair program 134 proceeds to step 316 to request an authentication.

In an embodiment, pair program 134 sends an acknowledgement (step 310). In other words, responsive to determining that the pairing between smart devices is intact, pair program 134 sends an acknowledgement request to paired smart device that is not associated with the action to be executed. In an embodiment, the acknowledgement request is a request to the owner of the paired smart devices requesting acknowledgement of the action to be executed. In an embodiment, the acknowledgement from the owner of the smart devices may be a click of an "ACCEPT" or "REJECT" icon. In another embodiment, the acknowledgement from the owner of the smart devices may be a verbal "ACCEPT" or "REJECT". In yet another embodiment, the acknowledgement from the owner of the smart devices may be a haptic response from the owner of the smart devices (e.g., slowly moving the smart device in a circle to "ACCEPT" or shaking the smart device to "REJECT"). In yet another embodiment, the acknowledgement from the owner of the smart devices may be a biometric response from the owner of the smart devices (e.g., a fingerprint of the owner within five seconds of receiving the acknowledgement request results in an "ACCEPT", no fingerprint within five seconds results in a "REJECT"). In an embodiment, pair program 134 sends an acknowledgement request to managing computing device 120 due to the indicated action to be executed on computing device 130. For example, the smart-watch owned by "Joe" and the tablet computer owned by "Joe" are both sent an acknowledgement request to acknowledge the power down request on the smartphone owned by "Joe".

In an embodiment, pair program 134 determines whether the sent acknowledgement was accepted (decision step 312). In other words, pair program 134 determines whether the owner of the smart devices has accepted (i.e., confirmed) the action to be executed on the smart device of the owner. In one embodiment (decision step 312, YES branch), the owner of the smart devices has accepted the action to be executed on the smart device of the owner; therefore, pair program 134 proceeds to step 314 to allow the received action. In the embodiment (decision step 312, NO branch), the owner of the smart devices has not accepted the action to be executed on the smart device of the owner; therefore, pair program 134 proceeds to step 316 to request an authentication.

In an embodiment, pair program 134 allows an action (step 314). In other words, responsive to determining that the sent acknowledgement was accepted, pair program 134 allows the indicated action (step 306) to be executed without requiring an authentication from a user. In an embodiment, pair program 134, on computing device 130, does not request an authentication from the user of computing device 130, which results in the indicated action being executed on computing device 130. For example, since the pairing between the smartphone owned by "Joe" and the tablet computer owned by "Joe" is intact, the action to power-off the smartphone owned by "Joe" is executed.

In an embodiment, pair program 134 requests an authentication (step 316). In other words, responsive to determining that the pairing between smart devices is not intact or that the sent acknowledgement was not accepted, pair program 134 requests an authentication to allow the indicated action (step 306) to execute. In an embodiment, the requested authentication may be a single factor authentication (e.g., a password or a biometric feature such as a fingerprint), a multi-factor authentication (e.g., a password and a code, sent to the smart device and input by a user on the smart device), or any other type of authentication known in the art. In an embodiment, pair program 134 requests an authentication on computing device 130 to allow the indicated action to execute on computing device 130. For example, before airplane mode is enabled on the smart-watch owned by "Joe", a request is sent to "Joe" to enter a password on the smart-watch owned by "Joe" to verify that "Joe" is the owner of the smart-watch and that "Joe" accepts the result of the action executed on the smart-watch.

In an embodiment, pair program 134 determines if the authentication is correct (decision step 318). In other words, pair program 134 determines if the authentication requested by pair program 134 (step 316) is correct. In an embodiment, the determination is made by comparing the received authentication to an authentication stored to information repository 132. In another embodiment, the determination is made via any password verification technique known in the art. In an embodiment (decision step 318, YES branch), the requested authentication is correct; therefore, pair program 134 returns to step 314 and allows the indicated action to execute (previously discussed). In the embodiment (decision step 318, NO branch), the requested authentication is not correct; therefore; pair program 134 proceeds to step 320.

In an embodiment, pair program 134 sends an alert (step 320). In other words, responsive to determining that the authentication received on a first paired smart device is not correct, pair program 134 sends an alert to the second paired smart device when two smart devices are paired, to all of the other paired smart devices when more than two smart devices are paired, and to managing computing device 120. In an embodiment, the second paired smart device and managing computing device 120 may be the same smart device. In another embodiment, the second paired smart device and managing computing device 120 may be different smart devices. In an embodiment, the sent alert may be an audible alert selected by a user. In another embodiment, the sent alert may be a default audible alert included in the smart device. In yet another embodiment, the sent alert may be a visual alert such as a text message, a flashing indicator light, a flashing screen, a warning message displayed on the smart device, or any other visual alert known in the art. In yet another embodiment, the sent alert may be any combination of audible and visual alerts. In an embodiment, pair program 134 sends an alert to managing computing device 120 of an unauthorized action on computing device 130. For example, the smart-watch owned by "Joe" sends both an audible alert and a visual alert to the tablet computer owned by "Joe" alerting "Joe" that an unauthorized attempt to turn on airplane mode of the smart-watch owned by "Joe" was attempted.

In an embodiment, pair program 134 prevents an action (step 322). In other words, pair program 134 prevents the indicated action (step 306) from executing on the smart device. In an embodiment, the indicated action is not executed, the smart device is locked preventing any input to the smart device. In another embodiment, the indicated action is mimicked (i.e., the smart device acts as if the indicated action was executed and the smart device responds accordingly; however, the indicated action is not actually executed by the smart device). In an embodiment, pair program 134 prevents the indicated action (step 306) from executing on computing device 130. For example, the smart-watch owned by "Joe" displays that the smart-watch is in airplane mode but in actuality, the smart-watch is only mimicking that the smart-watch is in airplane mode.

Figure 4:
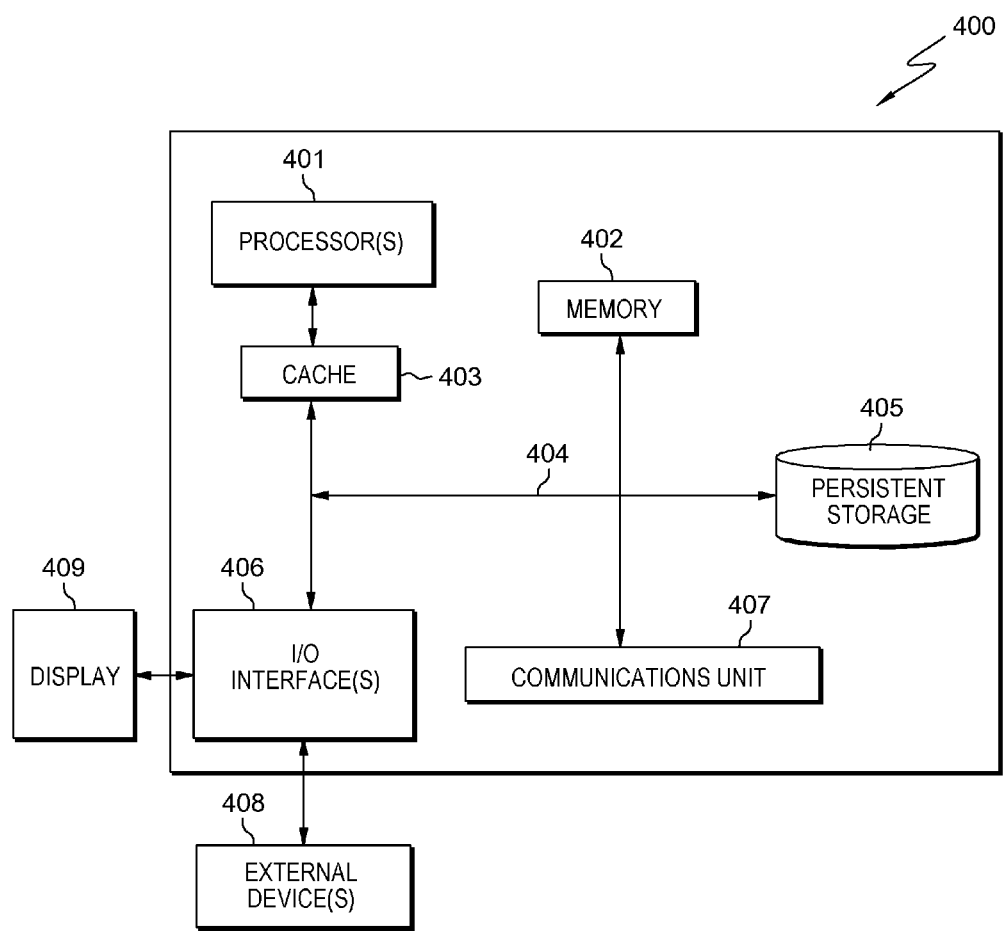
FIG. 4 depicts a block diagram of components of the computing environment of FIG. 1, in accordance with an embodiment of the present invention.

FIG. 4 depicts computer system 400, which is an example of a system that includes manage program 124 or pair program 134. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for deterring theft of devices, the method comprising:
   receiving, by one or more computer processors, a request to pair a first device with a second device;
   sending, by one or more computer processors, a first indication from the second device to the first device, wherein the first indication confirms that the second device is paired with the first device;

receiving, by one or more computer processors, one or more actions from the first device, wherein the one or more actions may be taken on the second device;

receiving, by one or more computer processors, a second indication on the second device, wherein the second indication includes a first action;

determining, by one or more computer processors, whether the first action is included in the one or more actions;

responsive to determining that the first action is included in the one or more actions, determining, by one or more computer processors, whether the first device is paired with the second device;

responsive to determining that the first device is paired with the second device, requesting, by one or more computer processors, a confirmation from the first device;

receiving, by one or more computer processors, the requested confirmation;

determining, by one or more computer processors, whether the requested confirmation is accepted;

responsive to determining that the requested confirmation is not accepted, requesting, by one or more computer processors, a first authentication from a user of the second device; and receiving, by one or more computer processors, the first authentication from the user of the second device.

2. The method of claim 1, further comprising:

responsive to determining that the first device is not paired with the second device, requesting, by one or more computer processors, a second authentication from a user of the second device;

receiving, by one or more computer processors, the second authentication from the user of the second device;

determining, by one or more computer processors, whether the second authentication is correct; and responsive to determining that the second authentication is correct, allowing, by one or more computer processors, the first action.

3. The method of claim 2, further comprising:

responsive to determining that the second authentication is not correct, preventing, by one or more computer processors, the first action; and sending, by one or more computer processors, an alert to the first device.

4. The method of claim 1, further comprising:

determining, by one or more computer processors, whether the first authentication is correct; and responsive to determining that the first authentication from the second device is correct, allowing, by one or more computer processors, the first action.

5. The method of claim 1, further comprising:

determining, by one or more computer processors, whether the first authentication is correct;

responsive to determining that the first authentication from the second device is not correct, preventing, by one or more computer processors, the first action; and sending, by one or more computer processors, an alert to the first device.

6. The method of claim 1, wherein the one or more actions to be executed on the second device are selected from the group consisting of powering off the second device, enabling airplane mode on the second device, turning off a GPS on the second device, turning off mobile data on the second device, enabling silent mode on the second device, or turning off Wi-Fi data on the second device.

7. A computer program product for deterring theft of devices, the computer program product comprising:

one or more computer readable storage media; and program instructions stored on the one or more computer readable storage media, the program instructions comprising:

program instructions to receive a request to pair a first device with a second device;

program instructions to send a first indication from the second device to the first device, wherein the first indication confirms that the second device is paired with the first device;

program instructions to receive one or more actions from the first device, wherein the one or more actions may be taken on the second device;

program instructions to receive a second indication on the second device, wherein the second indication includes a first action;

program instructions to determine whether the first action is included in the one or more actions;

responsive to determining that the first action is included in the one or more actions, program instructions to determine whether the first device is paired with the second device;

responsive to determining that the first device is paired with the second device, program instructions to request a confirmation from the first device;

program instructions to receive the requested confirmation;

program instructions to determine whether the requested confirmation is accepted;

responsive to determining that the requested confirmation is not accepted, program instructions to request a first authentication from a user of the second device; and program instructions to receive the first authentication from the user of the second device.

8. The computer program product of claim 7, further comprising program instructions stored on the one or more computer readable storage media, to:

responsive to determining that the first device is not paired with the second device, request a second authentication from a user of the second device;

receive the second authentication from the user of the second device;

determine whether the second authentication is correct; and responsive to determining that the second authentication is correct, allow the first action.

9. The computer program product of claim 7, further comprising program instructions stored on the one or more computer readable storage media, to:

determine whether the first authentication is correct; and responsive to determining that the first authentication from the second device is correct, allow the first action.

10. The computer program product of claim 8, further comprising program instructions stored on the one or more computer readable storage media, to:

responsive to determining that the second authentication is not correct, prevent the first action; and send an alert to the first device.

11. The computer program product of claim 7, further comprising program instructions stored on the one or more computer readable storage media, to:

determine whether the first authentication is correct;
responsive to determining that the first authentication from the second device is not correct, prevent the first action; and
send an alert to the first device.

12. The computer program product of claim 7, wherein the one or more actions to be executed on the second device are selected from the group consisting of powering off the second device, enabling airplane mode on the second device, turning off a GPS on the second device, turning off mobile data on the second device, enabling silent mode on the second device, or turning off Wi-Fi data on the second device.

13. A computer system for deterring theft of devices, the computer system comprising:
one or more computer processors;
one or more computer readable storage media; and
program instructions stored on the one or more computer readable storage media for execution by at least one of the one or more computer processors, the program instructions comprising:
program instructions to receive a request to pair a first device with a second device;
program instructions to send a first indication from the second device to the first device, wherein the first indication confirms that the second device is paired with the first device;
program instructions to receive one or more actions from the first device, wherein the one or more actions may be taken on the second device;
program instructions to receive a second indication on the second device, wherein the second indication includes a first action;
program instructions to determine whether the first action is included in the one or more actions;
responsive to determining that the first action is included in the one or more actions, program instructions to determine whether the first device is paired with the second device;
responsive to determining that the first device is paired with the second device, program instructions to request a confirmation from the first device;
program instructions to receive the requested confirmation;
program instructions to determine whether the requested confirmation is accepted;
responsive to determining that the requested confirmation is not accepted, program instructions to request a first authentication from a user of the second device; and
program instructions to receive the first authentication from the user of the second device.

14. The computer system of claim 13, further comprising program instructions stored on the one or more computer readable storage media for execution by at least one of the one or more computer processors, to:
responsive to determining that the first device is not paired with the second device, request a second authentication from a user of the second device;
receive the second authentication from the user of the second device;
determine whether the second authentication is correct; and
responsive to determining that the second authentication is correct, allow the first action.

15. The computer system of claim 14, further comprising program instructions stored on the one or more computer readable storage media for execution by at least one of the one or more computer processors, to:
responsive to determining that the second authentication is not correct, prevent the first action; and
send an alert to the first device.

16. The computer system of claim 13, further comprising program instructions stored on the one or more computer readable storage media for execution by at least one of the one or more computer processors, to:
determine whether the first authentication is correct; and
responsive to determining that the first authentication from the second device is correct, allow the first action.

17. The computer system of claim 13, further comprising program instructions stored on the one or more computer readable storage media for execution by at least one of the one or more computer processors, to:
determine whether the first authentication is correct;
responsive to determining that the first authentication from the second device is not correct, prevent the first action; and
send an alert to the first device.

* * * * *